United States Patent Office 3,835,102
Patented Sept. 10, 1974

3,835,102
ELECTROCONDUCTIVE HIGH POLYMER COMPOSITION
Isao Shinohara, Eishun Tsuchida, and Katsuhiro Mizoguchi, Tokyo, Japan, assignors to Nippon Electric Company, Limited, Tokyo-to, Japan
No Drawing. Filed Aug. 2, 1972, Ser. No. 277,177
Claims priority, application Japan, Aug. 4, 1971, 46/58,256
Int. Cl. C08f 27/04, 27/08
U.S. Cl. 260—78.4 N
28 Claims

ABSTRACT OF THE DISCLOSURE

A high polymer composition comprising a salt constituted from an integral type of polycationic polymer containing in its principal repeating unit quaternized nitrogen atoms and aromatic groups, an anion radical of a tetracyano compound and a neutral tetracyano compound in appropriate amounts such that the electroconductivity is greater than $10^{-5}$ mho/cm. For practical uses, it has very excellent chemical, physical and electrical properties.

BACKGROUND OF THE INVENTION

Field of the Invention

The present invention relates to an electroconductive high polymer composition.

More particularly, the present invention relates to an electroconductive polymer material and in particular to a complex polyion composition prepared by using a polycationic polymer as a matrix for the formation of simple salts within said polycationic polymer. In the preparation, a radical anionic compound possessing a structure capable of imparting an electroconductivity to said polycationic polymer, such as the radical anion of 7,7,8,8-tetracyanoquinodimethane combines with the cationic sites within the polymer. A neutral tetracyano compound, such as 7,7',8,8'-tetracyanoquinodimethane (hereinafter to be abbreviated as TCNQ), is added to the polymer and unites with the ionic moieties to form complex salts. Furthermore, this invention relates to a process for preparing said complex electroconductive polymer.

Description of the Prior Art

As is well known, in general, almost all high polymer materials are good electric insulators. Recent progress within the electronics industry has lead to the need for electroconductive high polymer materials easy to process and having electroconductivities of the same order as inorganic semiconductor materials. Thus, the development of electroconductive high polymer materials has been greatly accelerated. Conventional electroconductive high polymer materials include (1) ion-conductive high polymer materials such as those found among high polymer electrolytes, and (2) electron-conductive high polymer materials having conjugated double bonds of $\pi$-electrons such as polyacetylene or graphite. Ion-conductive high polymer materials, however, have an electroconductivity of the order of $10^{-8}$ mho/cm. at most, which is far lower than that of inorganic semiconductors. Furthermore, the corrosion of electrodes or the consumption of ionic groups due to electrolytic phenomena results in the deterioration of materials employed so as to render the practical use of ion-conductive high polymer materials in electronic materials of high reliability inadvisable. As is well known, electron-conductive high polymer materials include (1) linear and planar $\pi$-electron conjugated high polymer compounds such as polyenes, polyines, polyphenylene, graphite, etc.; (2) high polymer chelate compounds such as poly-Cu-phthalocyanine, and (3) charge-transfer type high polymer compounds such as polyvinyl carbazole-iodine, etc. There are, particularly, among linear or planar conjugated systems or high polymer chelates, compounds that have an electro-conductivity as high as that of inorganic semiconductors. These compounds are much less easy to process, insoluble in almost every solvent, and possess no heat-softening properties. Thus, these compounds at best can only be used in powder form, such as a carbon-powder, and have a limited range of practical use. In an effort to find electroconductive high polymer materials which are easily made into films and easy to process, attention has been focused upon complex charge-transfer polymer materials comprising various kinds of donor and acceptor species. However, these materials have no serviceable electroconductivity for practical use. Particularly, in complex charge-transfer polymer materials, bonds between donor molecules and acceptor molecules depend only upon complex charge-transfer type bonds resulting in high potential barriers to the flow of electrons, making it difficult to increase the level of electroconductivity.

In contrast to these materials, a complex of a polycationic polymer and the 7,7',8,8'-tetracyanoquinodimethane radical, as described in Japanese Patent Publication Gazette No. 15870/1969 which corresponds to U.S. Pat. No. 3,346,444, is recognized as being easily processed and as having a high electroconductivity. However, it is not serviceable practically because of its low measurement reproducibility and its low stability.

SUMMARY OF THE INVENTION

Accordingly, it is one object of the present invention to provide an electroconductive high polymer composition which does not have the aforementioned difficulties and, for practical applications, has excellent chemical, physical and electrical properties.

It is another object of the invention to provide an economically advantageous process for preparing useful electroconductive high polymer compositions.

These and other objects, as will hereinafter become more readily apparent, have been attained by an electroconductive high polymer composition which comprises a salt of an integral type of polycationic polymer containing in its principal repeating unit, quaternized nitrogen atoms and aromatic groups as the cationic portion of said salt, an anion radical of a tetracyano compound, and a sufficient amount of a neutral tetracyano compound to impart to said salt an electroconductivity greater than $$10^{-7} \mho \text{ cm.}^{-1}.$$

The process for preparing these electroconductive high polymer compositions comprises reacting an integral type of polycationic polymer containing in its principal chain thereof, quaternized nitrogen atoms and aromatic rings, with a metallic salt or organic cation salt of a tetracyano anion radical in a solution under an atmosphere of nitrogen. Thus, a complex polycationic polymer containing a tetracyano anion radical is obtained by adding a neutral tetracyano compound in solution to the complex. The electroconductive high polymer compositions of the present invention achieved by structural considerations concerning $\pi$-electron conduction, display an extremely excellent effect.

DETAILED DESCRIPTION OF THE PREFERRED EMBODIMENTS

By considering the mechanism of electroconduction due to nonlocalized $\pi$-electrons, it has been possible to divide the structure of the complex, functionally, into a matrix portion and a portion in which conduction electrons are active. That is, in the composition of the present invention, the cationic polymer portion can be considered to be a matrix of a complex which functions to maintain a conjugated system, but which also determines the degree of heat resistance and processability of the system. Therefore, the structure of the cationic polymer is considered to have an important bearing on the electroconductivity of the complex.

In molecular design trials on the structure of macromolecular polyion complexes, it has been found that the reaction of a low molecular weight radical anion with a polycationic polymer will result in the formation of a complex of salt type bonds. The portion which contributes to electroconduction is attributed to TCNQ in the combination of a high polycationic polymer and a TCNQ radical anion. Doping of the structure is considered necessary in order to completely establish a conjugated system in the complex. Thus, the structure and arrangement of a conjugated system which is responsible for electroconduction, is extremely important. In fact, various polycations having pendant type structures or integral type structures show wide variations in their properties. A compound having almost no regular space arrangement displays almost no electroconductivity. Along these lines, unit structures of many polycationic polymers have been examined, and it has been found that an integral type of polycationic polymer having its principal chain represented by the formula:

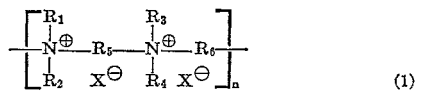

(1)

is effective. In particular, a polycationic polymer consisting of a chain having xylylene groups dispersed therein as shown by the formula:

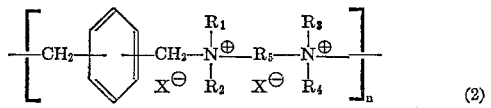

(2)

is most effective.

In the formulas (1) and (2) above, $R_1$, $R_2$, $R_3$ and $R_4$ are alkyl groups having 1 to 4 carbon atoms, wherein $R_1$, $R_2$, $R_3$ and $R_4$ may be the same or different; $R_5$ and $R_6$ may be the same or different and each member is selected from the group consisting of unsaturated alkylene, aryl alkylene and xylylene groups; and $X^{\ominus}$ is a counter ion to the ammonium group.

By way of comparison, a polycationic polymer described in the Japanese Patent Publication Gazette No. 15870/1969 which correspond to U.S. Pat. #3,346,444 is cited. The polycationic polymer described in the publication has pendant pyridine groups or phenyl groups connected to the methylene chain in which the nitrogen atoms are quaternized. The complexes cited in the publication gave one example with a high electroconductivity of $10^{-3}$ mho/cm. However, the reproducibility of the electroconductivity of the example was poor, its heat stability was low, and it easily deteriorated. In contrast, the polycationic polymers of this invention differ appreciably from the pendant type polymers in ease of preparation and in polymer compositions, as well as in the chemical, physical and electrical properties which are markedly superior. The polycationic polymers of the present invention are of the integral (or laminate) type having quaternized nitrogen cationic groups in the principal high molecular weight chain, and differ from the pendant type polymers in constitution. The preparation of the polycationic polymer of this invention from the raw materials selected is highly original. The pendant type of polymer is prepared by polymerizing a vinyl monomer and conducting the quaternization reaction on the resulting polymer with the aid of quaternizing agents, or by synthesizing a quaternized monomer by an extremely difficult process and then polymerizing the monomer. On the other hand, the integral type of polycationic polymers of the present invention are advantageously and very economically prepared by simple quaternization of the nitrogen atoms by the simultaneous polyaddition of arbitrary amounts of a diamine monomer and an organic dihalide in a one step process.

In contrast to the pendant type of polycationic complexes, the integral type of polycationic complexes of the present invention have excellent chemical, physical and electrical properties. In other words, the integral type of polycationic complexes have a polycationic polymer matrix having quaternized nitrogen cationic groups in the principal high molecular weight polymer chain so that an anion radical such as a TCNQ anion radical, which greatly contributes to the electroconductivity of the system, is systematically and closely arranged by chemical bonds making it spatially easy to introduce a tetracyano compound such as TCNQ into the matrix. Thus, the integral type of polycationic complexes display these excellent characteristics. In addition, they display electroconductivities greater by an order of 3 to 4, thermal variations in their electroconductivities smaller by a factor of about 3, and heat resistances greater by a factor of about 1.2 to 2 in comparison to the pendant type of complex TCNQ salts to which TCNQ is irregularly bonded.

The compositions of the present invention exhibit excellent solubility in many solvents. Suitable solvents include amides such as N,N'-dimethylformamide, N,N'-dimethylacetamide, etc., and acetonitrile, acetone, nitromethane, propylene carbonates, etc. In particularity, they are soluble to an extent of at least 20%, by weight, in solvents such as N,N-dimethylformamide, N,N'-dimethylacetamide, N,N'-dimethylsulfoxide, etc. The compositions of the present invention have excellent flexibility. A film prepared by the vaporization of the solvent from a dimethylformamide solution has a far wider range of application because it is extremely stable at temperatures from —30° C. to 200° C., mechanically strong and paramountly easy to process. The compositions have a very low hygroscopicity owing to the rigid bond between the polycationic polymer and the anion radical. The compositions suffer almost no change in their electrical characteristics, even after being allowed to stand for 1,000 hours in an atmosphere having a humidity of 67%.

Above all, the integral type of polycationic polymers have xylylene groups dispersed within the principal chain of the polymer, and have higher electroconductivities by an order of 2 to 3 and a several times higher electroconductive thermal stability in comparison to a polymer having methylene groups in the chain in place of xylylene units. These results are observed because a tetracyano anion radical such as the TCNQ anion radical is more systematically and firmly arranged in the principal chain of the xylylene substituted polymers. Furthermore, since a highly reactive dihalogenated xylene such as xylylene dichloride, xylylene dibromide or xylylene diiodide, etc. is employed in the synthesis of the principal chain, a polycationic polymer having a higher molecular weight is produced. These polymers exhibit excellent solvent solubility and are easily fabricated into structures such as films. Thus, the polyion complex comprising an integral type of polycationic polymer containing a xylylene group in the principal chain and a tetracyano anion according to the present invention has excellent solvent solubility, and is readily made into films. Because of the stability exhibited by the polymer when subjected to humid atmospheric conditions and thermal variations, the polymers possess the desired degree of weather-proofness and reliability needed in the electric and electronic fields.

The most stable and readily available tetracyano anion radicals useful in the present invention include the 7,7', 8,8'-tetracyanoquinodimethane anion radical and other tetracyano radical anions such as the tetracyanoethylene anion radical, the 1,2,4,5-tetracyanoquinone anion radical, the 1,2,4,5-tetracyano-thio-quinone anion radical, etc. When used to treat the polycationic polymer, these anion radicals are employed as metallic salts containing cations such as lithium, sodium, potassium, copper, iron, or cesium, etc., or as an organic cation salt of various amines, etc. Generally, these tetracyano radical anion salts are readily soluble in a solvent such as alcohol, water, etc. The salt most stable, when readily available and easiest to use, is the lithium TCNQ salt.

The polycationic polymer disclosed containing quaternized nitrogen cationic groups, and xylylene groups within the principal high polymer chain as shown in formula (2), and containing tetracyano anion radicals exhibits semiconductor properties. However, the complex polymeric salt within itself does not have sufficient electroconductivity. The addition of a neutral tetracyano compound thereto increases the electroconductivity of the complex polymeric salt up to $10^{-7}$ mho/cm. or more. Consequently, the conductive materials of the present invention comprise a complex polymeric salt containing individual salt moieties associated with neutral tetracyano compounds added thereto. In this case the neutral tetracyano compound to be added to the complex polymeric salt may be the same parent compound of the tetracyano anion radical or a different tetracyano compound.

Thes following description shows the process for preparing the compositions of the present invention in which the lithium salt of TCNQ is used as the tetracyano radical anion. The present invention, however, is not limited only to the lithium salt of TCNQ. A polycationic polymer, which is the basic substrate of the present invention, is readily soluble in alcohol solvents such as methanol, ethanol, and water. An alcoholic solution containing a desired quantity of the lithium salt of TCNQ is added to the requisite amount of polycationic polymer, which is completely dissolved in one of the solvents or a mixture of these solvents with vigorous stirring under a nitrogen atmosphere. Then, the resulting polycationic polymer treated with the simple salt of TCNQ separates as a green or black precipitate, while the lithium halogenide produced in the reaction remains dissolved in the solution. Thus, separation of the products of the reaction is easy. The reaction variables of temperature and time may be conveniently altered to accommodate the kind and concentration of materials used. As a result of the study of the reaction, the most favorable reaction conditions appear to be a reaction temperature ranging from 0° to 50° C., and a reaction time ranging from 30 minutes to 5 hours. As is well known, the anion radicals of tetracyano compounds readily react with hydrogen ions and oxygen, and are converted to other materials. Therefore, in order to reduce the loss of materials due to side reactions in the synthesis of the present invention, all solvents are sufficiently degassed and exposed to nitrogen gas before use, and all reactions are conducted under an atmosphere of nitrogen. When water is used as the solvent, the hydrogen ion concentration is decreased so as to reduce side reactions occurring from the presence of hydrogen ions in solution. Thus, the reaction can be conducted using stoichiometric quantities of the reactants, and yields in excess of 90% can be obtained in most cases. Chemical analysis of the product confirmed the synthesis of the desired polymeric material containing quaternized nitrogen cationic groups associated with TCNQ anion radicals.

Although the polycationic polymer-containing associated TCNQ radical anions shows an insufficient electroconductivity in itself, it has been found that the addition of a sufficient amount of neutral TCNQ (5–50% by weight) based on the weight of the TCNQ anion produces a $\pi$-electron conductive high polymer material having an extremely high electroconductivity above $10^{-5}$ mho/cm. Neutral TCNQ may be added to the complex polymeric salt by simple mixing of the reactants or by exposure of the salt to a solution containing the neutral TCNQ. Our study has revealed that simple mixing of the reactants does not lead to the formation of a complete complex of both materials, and yields a product giving inferior reproducibility in its electroconductivity measurements. On the other hand, the solution method of mixing the reactants gives a product exhibiting good and stable reproducible electroconductivity measurements.

The polyion complexes of the present invention display a solubility of at least 30% by weight in solvents such as N,N' - dimethylformamide, N,N' - dimethylacetoamide, N,N'-dimethylsulfoxide, N-methyl-2-pyrrolidone, etc. In order to make an electroconductive film, sufficient quantities of a polycationic polymer associated with TCNQ anions and an appropriate amount of neutral TCNQ are dissolved in one of the solvents. The resulting solution is poured onto a base such as a plastic or glass plate, and the solvent is evaporated under a sufficiently reduced pressure. A glossy and adhesive film is formed which does not have pinholes or cracks.

Various measurements have been made to test several properties of the films. It has been found that these films have a high electroconductivity of $10^{-5}$ mho/cm. or more, the frequency characteristics of the electroconductivity are completely stable up to at least 10 kc. and the variations in electroconductivity caused by thermal changes are very small. Various film samples were allowed to stand in a thermohydrostat at a temperature of 80° C. in a humidity level of 67%. Measurement of various electrical, chemical and physical properties after exposure to the humid atmosphere revealed that the films were stable for at least 2,000 hours. The polycationic polymer associated with TCNQ anion and neutral TCNQ moieties may be used alone or in combination with any other highly resistive polymer.

Having now generally described the invention, a further understanding can be attained by reference to certain specific Examples which are provided herein for purposes of illustration only and are not intended to be limiting in any manner unless otherwise herein specified.

EXAMPLE 1

A 7.1 g. (0.024 mole) quantity of a polycationic polymer produced by the nitrogen quaternization reaction between N,N,N',N'-tetramethylhexamethylenediamine and p-xylylenedichloride was completely dissolved in 1 l. of distilled water and was reacted with 10.5 g. (0.05 mole) of the lithium salt of TCNQ dissolved in 1.5 l. of methanol with vigorous stirring under an atmosphere of nitrogen at 30° C. for 2 hours. The methanol-water solvent used was previously degassed by refluxing the solvent for 10 hours, and then exposed to nitrogen gas. The reaction solution was adjusted to pH 7.5 with a phosphoric acid buffer solution. After stirring for about 1 hour, a dark blue precipitate separated from solution. The solution was filtered, and the precipitate was washed with distilled water and methanol and then dried by an aspirator and then under vacuum. A 13.82 g. quantity of the reaction product was obtained for a 98.8% yield assuming that all the counter ions were exchanged with TCNQ ion. Thus, an almost complete stoichiometry in the exchange of anionic species was observed. This observation was confirmed by chemical analyses such as ultimate analysis, halogen analysis, ESR analysis, etc. on the reaction product. These analyses show that the exchange of TCNQ ion with chloride ion was more than 98% complete.

Next, 150 mg. of a polycationic polymer associated with TCNQ anion was completely dissolved in 1 ml. of dimethylformamide. A solution of dimethylformamide containing an appropriate amount of neutral TCNQ was added to the polymeric solution and the homogeneous mixture was stirred at room temperature. When the resulting solution was poured onto a glass plate and solvents were sufficiently vaporized under reduced pressure, a glossy black film having improved adhesion properties was obtained. The electroconductivity of various films containing different amounts of neutral TCNQ so obtained were measured, and the results are shown in Table I.

TABLE I

| Amount of neutral TCNQ in film, neutral TCNQ/ TCNQ (mole ratio): | ρ (Volume inherent resistivity), Ω·cm. |
|---|---|
| 0 | <$10^9$ |
| 0.1 | $1.5 \times 10^7$ |
| 0.2 | $2.4 \times 10^5$ |
| 0.3 | $3.4 \times 10^4$ |
| 0.4 | $1.14 \times 10^3$ |
| 0.5 | $5.6 \times 10^3$ |

The film showed the highest electroconductivity value when the molar ratio of neutral TCNQ to anionic TCNQ added was 0.4. The thermal variations thereof were very small, and the activation energy was 0.5 ev. When the frequency variation of the electroconductivity of the material was measured, it was found to be stable up to several 100 kc. Furthermore, thermal analysis showed the material to be stable up to at least about 210° C. Also, the changes in the properties of the material due to heat and humidity were very small and even though the material was allowed to stand in a thermohygrostat at 85° C. under a 67% humidity for at least 1,000 hours, the film was unchanged in its electrical, chemical and physical properties and had an excellent reliability.

EXAMPLE 2

A 4.78 g. quantity (0.015 mole) of the polycationic polymer produced by the nitrogen quaternization reaction between N,N,N',N' - tetramethyltetramethylenediamine, and p-xylylenedichloride was dissolved in a mixed solvent of 250 ml. of water and 250 ml. of methanol. The resulting polymer containing solution was treated with 8.02 g. (0.031 mole) of the lithium salt of TCNQ dissolved in 500 ml. of methanol with vigorous stirring under an atmosphere of nitrogen at 40° C. for 2 hours. After the reaction, the precipitate was immediately separated by filtration and, after repeated washing with distilled water and methanol, it was sufficiently dried. The yield of product thus obtained was 9.83 g. Chemical analysis confirmed that the desired product was obtained. Glossy films having improved adhesion properties and showing excellent workability were made from the product in the same manner as in Example 1. Each film strip contained a different amount of neutral TCNQ. The electroconductivity of these film strips are shown in Table II.

TABLE II

| Amount of neutral TCNQ in film, neutral TCNQ/anion TCNQ (mole ratio): | ρ (Volume inherent resistivity), Ω·cm. |
|---|---|
| 0 | $2.6 \times 10^7$ |
| 0.1 | $1.9 \times 10^6$ |
| 0.2 | $4.2 \times 10^5$ |
| 0.3 | $1.7 \times 10^5$ |
| 0.4 | $7.4 \times 10^3$ |
| 0.5 | $1.5 \times 10^2$ |

The film showing the lowest resistance value of $1.5 \times 10^2$ Ω·cm. contains a 0.5 mole ratio of neutral TCNQ to anionic TCNQ. The film exhibited an activation energy of 0.502 ev. in the temperature range of from 25° C. to 125° C. and was quite stable up to at least 160° C.

EXAMPLE 3

A 4.37 g. quantity (0.015 mole) of the polycationic polymer produced by the nitrogen quaternization reaction between N,N,N',N'-tetramethylethylenediamine and p-xylylenedichloride was dissolved in a mixed solvent of water and methanol consisting of 250 ml. of water and 250 ml. of methanol. The resulting polymer containing solution was treated with 8.02 g. (0.036 mole) of the lithium salt of TCNQ completely dissolved in 500 ml. of methanol with vigorous stirring under an atmosphere of nitrogen at 40° C. for 3 hours.

After the reaction, a dark black precipitate was separated by filtration, and after repeated washing with methanol, was sufficiently dried. An 8.93 g. quantity of the product was obtained. Chemical analysis confirmed the complete replacement of chlorine ion with TCNQ ion in the product. Thirty-five percent by weight of the product was soluble in dimethylformamide. Glassy films having improved adhesion properties and excellent workability were obtained by the processes of the proceeding Examples. The electroconductivity of the films containing different amounts of neutral TCNQ were measured as shown in Table III.

TABLE III

| Amount of neutral TCNQ in film, neutral TCNQ/anion TCNQ (mole ratio): | ρ (Volume inherent resistivity), Ω·cm. |
|---|---|
| 0 | $2.7 \times 10^7$ |
| 0.1 | $3.8 \times 10^6$ |
| 0.2 | $2.1 \times 10^5$ |
| 0.3 | $9.6 \times 10^3$ |
| 0.4 | $3.2 \times 10^3$ |
| 0.5 | $9.1 \times 10^2$ |

The film showing the lowest resistance value of $9.1 \times 10^2$ Ω·cm. contains a 0.5 mole ratio of neutral TCNQ to anionic TCNQ. The film was quite stable up to at least 200° C. Also, the frequency variations of the films were very stable, and the resistance value was not changed up to a frequency of 1 mHz.

N,N,N',N'-tetramethylpentane diamine may be employed in place of the N,N,N',N'-tetramethylethylenediamine in the above example. The products resulting from this replacement were suitable for film-making. One film manufactured from this material shows resistivities as high as $1.4 \times 10^6$ to $9.7 \times 10^2$ Ω·cm.

EXAMPLE 4

A 7.29 g. quantity of the polycationic polymer having the formula:

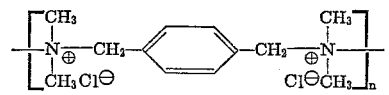

was completely dissolved in 1.5 l. of methanol, which was degassed and exposed to nitrogen gas, and 8.6 g. of lithium salt of TCNQ dissolved in 1.5 l. of methanol similarly treated was added dropwise to the polymer solution. The reaction was conducted at a reaction temperature of 40° C. under an atmosphere of nitrogen for 3 hours. One hour after the reaction a blue precipitate formed. The precipitate was separated by filtration, sufficiently washed with water and methanol, and sufficiently dried by an aspirator and by a vacuum drier.

A 13.1 g. quantity of product was obtained and, assuming a complete exchange of anion, the yield was 93.6%. Thus, the reaction proceeded almost stoichiometrically. Ultimate analysis, halogen analysis and other instrumental analyses of the product confirmed the complete exchange of chloride ions with TCNQ anions. The product was dissolved in 1 ml. of dimethylformamide and was processed by the method described in Example 1 to produce a dark blue film having improved adhesion properties. Results of the electric resistivity measurements on these films are shown in Table IV.

TABLE IV

| Amount of neutral TCNQ added in film, neutral TCNQ/anion TCNQ (mole ratio): | Volume inherent resistivity, Ω·cm. |
|---|---|
| 0 | $4.3 \times 10^3$ |
| 0.1 | $3.5 \times 10^6$ |
| 0.2 | $2.3 \times 10^5$ |
| 0.3 | $5.8 \times 10^4$ |
| 0.4 | $7.1 \times 10^3$ |

Thermal measurements of this kind of material revealed that it was stable up to about 200° C. Also, the electroconductive frequency did not change up to several hundred kc.

The films of the present invention did not experience any change in electroconductivity even when an electric current was passed through the film for 1,000 hours at a constant temperature of 80° C. and a constant humidity of 67%. Thus, these films have a very high reliability.

Although, in Examples 1, 2 and 3, specific methylene chain lengths are described for the diamine monomers, in general, any methylene chain having 2 to 18 carbon atoms is sufficient. However, if the number of carbon atoms in the methylene chain is greater than 18, the distance between neighboring TCNQ anions increases, and the potential barrier of the electroconductive carriers increases, resulting in a decreased electroconductivity.

The polyion complex of the present invention can be employed in numerous ways. For example, the polyionic complexes of this invention can be dissolved in an appropriate solvent. The solution is coated on an electronic part for an electronic instrument such as a print plate of an electronic circuit, an electronic part of a semiconductor element, etc., to form an electroconductive strip. Other uses include the use of the films as a substitute for metal and solder, as a coating agent for an exothermic body, a photoelectric body, and for the formation of an electroconductive film.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. An electroconductive high polymer composition which comprises a salt of an integral type of polycationic polymer containing in its principal repeating unit chain, quaternized nitrogen atoms, as the cationic portion of said salt, and, an anion radical of a tetracyano compound as the anion portion of said salt, and a neutral tetracyano compound in an amount sufficient to impart an electroconductivity of more than $10^{-5}$ mho/cm. to said salt.

2. The electroconductive high polymer composition as set forth in Claim 1, wherein said polycationic polymer has the structure:

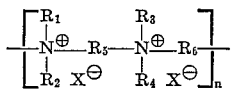

wherein $R_1$, $R_2$, $R_3$ and $R_4$ may be the same or different, and each represents an alkyl group containing 1 to 4 carbon atoms; $R_5$ and $R_6$ may be the same or different and each represents a member selected from the group consisting of unsaturated alkylene, aryl alkylene and xylylene, and $X^{\ominus}$ is a counter ion to the ammonium groups.

3. The electroconductive high polymer composition of Claim 12, wherein said principal chain has the formula:

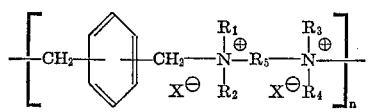

wherein $R_1$, $R_2$, $R_3$ and $R_4$ may be the same or different, and each represents an alkyl group containing 1 to 4 carbon atoms; $R_5$ is selected from the group consisting of unsaturated alkylene, aryl alkylene and xylylene, and $X^{\ominus}$ is a counter ion to be ammonium groups.

4. The electroconductive high polymer composition of Claim 1, wherein said anion radical is 7,7',8,8'-tetracyanoquinodimethane anion radical.

5. The electroconductive high polymer composition of Claim 2, wherein said anion radical is 7,7',7,8'-tetracyanoquinodimethane anion radical.

6. A process for preparing an electroconductive high polymer composition which comprises reacting an integral type of polycationic polymer containing, in its principal repeating unit chain, quaternized nitrogen atoms, and a metallic salt or organic cation salt of a tetracyano anion radical in a liquid solution under an atmosphere of nitrogen to prepare a salt of polycationic polymer and a tetracyano anion radical and thereafter adding a neutral tetracyano compound to a solution of said salt.

7. The process of Claim 19, wherein said polycationic polymer has the formula:

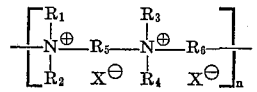

wherein $R_1$, $R_2$, $R_3$ and $R_4$ may be the same or different and each represents an alkyl group containing 1 to 4 carbon atoms; $R_5$ and $R_6$ may be the same or different and each represents a member selected from the group consisting of unsaturated alkylene, aryl alkylene and xylylene, and $X^{\ominus}$ is a counter ion to the ammonium groups.

8. The process of Claim 19, wherein said polycationic polymer has the formula:

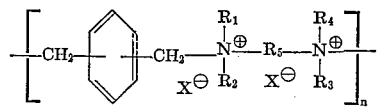

wherein $R_1$, $R_2$, $R_3$ and $R_4$ may be the same or different and each represents an alkyl group containing 1 to 4 carbon atoms; $R_5$ is selected from the group consisting of unsaturated alkylene, aryl alkylene and xylylene, and $X^{\ominus}$ is a counter ion to the ammonium groups.

9. The process of Claim 19, wherein said tetracyano anion radical is the 7,7',8,8'-tetracyanoquinodimethane anion radical.

10. The process of Claim 19, wherein said metallic salt of the tetracyano anion radical is the lithium salt of TCNQ.

11. The process of Claim 19, wherein the molar ratio of the neutral tetracyano compound to the anionic TCNQ ranges from 0.4 to 0.5.

12. An electroconductive high polymer composition which comprises a salt of an integral type of polycationic polymer containing in its principal repeating unit chain, quaternized nitrogen atoms and aromatic groups, as the cationic portion of said salt, and an anion radical of a tetracyano compound as the anion portion of said salt, and a neutral tetracyano compound in an amount sufficient to impart an electroconductivity of more than $10^{-5}$ mho/cm. to said salt.

13. The electroconductive high polymer composition as set forth in Claim 12, wherein said polycationic polymer has the structure:

14. The electroconductive high polymer composition of Claim 1, wherein said anion radiual is an anion radical selected from the group consisting of 7,7',8,8'-tetracyanoquinodimethane anion radical, tetracyanoethylene anion radicals, 1,2,4,5-tetracyanoquinone anion radical, and 1,2,4,5-tetracyanothio-quinone anion radical.

15. The electroconductive high polymer composition of Claim 12, wherein the neutral tetracyano compound is a metallic salt having a tetracyano anion selected from the group consisting of 7,7',8,8'-tetracyanoquindimethane anion radical tetracyanoethylene anion radical, 1,2,4,5-tetracyanoquinone anion radical, and 1,2,4,5-tetracyanothio-quinone anion radical and a cation selected from the group consisting of lithium, sodium, potassium, copper-iron, and cesium.

16. The electroconductive high polymer composition of Claim 12, wherein the amount of the neutral tetracyano compound is from 5 to 50% by weight based on the weight of the tetracyano anion present.

17. The electroconductive high polymer composition of Claim 12, wherein the polycationic polymer is nitrogen quarternization product of N,N,N',N'-tetramethyltetramethylenediamine, and p-xylylenedichloride and the neutral tetracyano compound is the lithium salt of TCNQ.

18. The electroconductive high polymer composition of Claim 12 wherein the neutral tetracyano compound and the tetracyano anion radical are present in a molar ratio of the neutral tetracyano compound to the anion radical of the tetracyano compound ranging from 0.4 to 0.5.

19. A process for preparing an electroconductive high polymer composition which comprises reacting an integral type of polycationic polymer containing, in its principal repeating unit chain, quaternized nitrogen atoms and aromatic groups, and a metallic salt or organic cation salt of a tetracyano anion radical in liquid solution under an atmosphere of nitrogen to prepare a salt of polycationic polymer and a tetracyano anion radical and thereafter adding a neutral tetracyano compound to a solution of said salt.

20. The process of Claim 19, wherein said polycationic polymer has the formula:

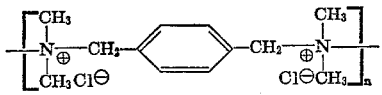

21. The process of Claim 19, wherein the tetracyano anion radical are selected from the group consisting of 7,7',8,8'-tetracyanoquinodimethane anion radical, tetracyanoethylene anion radical, 1,2,4,5-tetracyanoquinone anion radical and 1,2,4,5-tetracyano-thio-quinone anion radical.

22. The process of Claim 19, wherein the neutral tetracyano compounds contains an anion selected from the group consisting of 7,7',8,8'-tetracyanoquinodimethane anion radical, tetracyanoethylene anion radical, 1,2,4,5-tetracyanoquinone anion radical, and 1,2,4,5-tetracyano-thio-quinone anion radical and a cation selected from the group consisting of lithium, sodium, potassium, copper, iron and cesium.

23. The process of Claim 19, wherein the amount of the neutral tetracyano-compound added to the solution is from 5 to 50% by weight based on the weight of the tetracyano anion.

24. The process of Claim 19, wherein the reaction is carried out at a temperature ranging from 0° to 50° C. and for a reaction time ranging from 30 minutes to 5 hours.

25. The process of Claim 19, wherein the reaction takes place in the presence of a solvent selected from the group consisting of methanol, ethanol, water and mixtures thereof.

26. The process of Claim 19, wherein stoichiometric quantities of the reactants are employed in the reaction.

27. The process of Claim 19, which includes preparing the integral type polycationic polymer by quaternizing in a one step process a diamine monomer and a dihalogenated xylene to produce the integral type polycationic polymer.

28. The process of Claim 27, wherein the amine is N,N,N',N'-tetramethyltetramethylenediamine, the organic di- halide is is p-xylylenedichloride, the tetracyano anion radical is TCNQ, and the neutral tetracyano compound is a lithium salt of TCNQ.

References Cited

UNITED STATES PATENTS

| | | | |
|---|---|---|---|
| 3,346,444 | 10/1967 | Lupinski et al. | 161—213 |
| 3,632,526 | 1/1972 | Yamamoto et al. | 252—500 |
| 3,448,177 | 6/1969 | Goodings et al. | 260—895 |

JOSEPH SCHOFER, Primary Examiner

J. KIGHT, Assistant Examiner

U.S. Cl. X.R.

161—213; 252—500; 260—29.2N, 32.6N, 33.4R, 78.4R, 895